(12) United States Patent
Whittington

(10) Patent No.: US 7,575,448 B1
(45) Date of Patent: Aug. 18, 2009

(54) WELDING GROUND CLAMP

(76) Inventor: Jerry L. Whittington, 211 Oregon St., Odessa, TX (US) 79764

( * ) Notice: Subject to any disclaimer, the term of this patent is extended or adjusted under 35 U.S.C. 154(b) by 0 days.

(21) Appl. No.: 12/241,975

(22) Filed: Sep. 30, 2008

Related U.S. Application Data

(60) Provisional application No. 60/999,145, filed on Oct. 15, 2007.

(51) Int. Cl.
*H01R 4/66* (2006.01)
(52) U.S. Cl. .................... 439/100; 439/800
(58) Field of Classification Search ............... 439/100, 439/800
See application file for complete search history.

(56) References Cited

U.S. PATENT DOCUMENTS

| | | | | |
|---|---|---|---|---|
| 1,135,717 A | * | 4/1915 | Price | 439/800 |
| 1,486,560 A | * | 3/1924 | Becker | 439/100 |
| 3,594,682 A | * | 7/1971 | Oleson | 439/100 |
| 3,609,631 A | * | 9/1971 | Looney et al. | 439/100 |
| 3,860,785 A | * | 1/1975 | Wittman | 219/136 |
| 4,210,373 A | * | 7/1980 | McGee | 439/28 |
| 4,705,331 A | * | 11/1987 | Britton | 439/387 |
| 4,820,901 A | * | 4/1989 | Peviani | 219/138 |
| 5,046,958 A | * | 9/1991 | Brown | 439/92 |
| 5,616,036 A | * | 4/1997 | Polidori | 439/100 |
| 6,279,885 B1 | * | 8/2001 | Leon, Jr. | 269/8 |
| 7,122,739 B2 | * | 10/2006 | Franks, Jr. | 174/51 |

* cited by examiner

*Primary Examiner*—Gary F. Paumen
(74) *Attorney, Agent, or Firm*—Michael I Kroll

(57) ABSTRACT

A means for securing a grounding point in a stable position and stable means. Length of rod like material with a 1½ turn in center length, two offset bends on opposing sides after 1½ turn bend allows insulators and bolt to level. Opposing sides, short horizontal length between offsets to vertical down bend. Pipe radius bend travels, below center axis of desired pipe size radius, for gripping action. At end of radius bend a short outward bend, to aid in the applying and removing the ground from the pipe, and for protection of the pipe coating, Coated for insulation except for the 1½ turn bend, where movement of spring action is desired for holding power. Left side near vertical down bend, tube attached for holding the ground cable in a secure manor.

10 Claims, 9 Drawing Sheets

WELDING GROUND CLAMP

RELATED APPLICATIONS

This application is subject to U.S. provisional application Ser. No. 60/999,145 filed 15 Oct. 2007.

Please incorporate by reference all information in said provisional application into this instant application.

BACKGROUND OF THE INVENTION

1. Field of the Invention

The present invention relates generally to welding and, more specifically, to a grounding clamp for welders that physically forms a hands free connection between a grounding cable and workpiece comprised of a metallic electrically conductive material that grabs said workpiece to form an electrical connection at any chosen point, said connection is formed utilizing either spring bias from a tensive coil or physically locking hinges for larger pipes, that maintains pressure against the pipe and conductive parent metal during the duration of a welding process.

The present invention additionally provides for a grounding point on a pipeline that is positive and avoids arc or weld deposits outside of bevels typically not acceptable to code.

The present invention overcomes conventional grounds by eliminating the chance someone can knock off, pull off or naturally disengage the grounding cable.

The present invention finally allows a welder to fabricated pipes on the job in the shortest time possible and can be used on any size pipe.

2. Description of the Prior Art

There are other wielding device's designed for providing a welding ground. Typical of these is U.S. Pat. No. 3,609,631 issued to Loony et al. on Sep. 28, 1971.

Another patent was issued to Eric Wittman on Jan. 14, 1975 as U.S. Pat. No. 3,860,785. Yet another U.S. Pat. No. 4,210,373 was issued to McGee on Jul. 1, 1980 and still yet another was issued on Apr. 11, 1989 to Peviani as U.S. Pat. No. 4,820,901.

Another patent was issued to Brown on Sep. 10, 1991 as U.S. Pat. No. 5,046,958. Yet another U.S. Pat. No. 5,616,036 was issued to Polidori on Apr. 1, 1997. Another was issued to Leon on Aug. 28, 2001 as U.S. Pat. No. 6,279,885 and still yet another was issued on Oct. 17, 2006 to Franks as U.S. Pat. No. 7,122,739.

Another patent was issued to Hortmanns on Jun. 2, 1999 as European Patent No. EP0920079. Yet another Japanese Patent No. JP2001340970 was issued to Tanaka on Dec. 11, 2001. Another was issued to Heynis on Oct. 18, 2002 as Canadian Patent No. CA2353749

U.S. Pat. No. 3,609,631

Inventor: Robert Looney

Issued: Sep. 28, 1971

A ground clamp for a pipe-welding apparatus includes an accurate support member positionable upon and insulated from the work to be welded and flexible chain or cable means attachable to the support frame, and adjustable and lockable to secure the ground clamp into position upon the work. The support frame includes a sharply pointed grounding member biasable against the work to be grounded and having one end in ground connection to the welding apparatus. The ends of the ground clamp resting upon the work includes insulating members to insulate the frame from the work and the point of connection of the flexible chain or cable may also include insulating means to insulate the chain or cable from the work.

U.S. Pat. No. 3,860,785

Inventor: Eric Wittman

Issued: Jan. 14, 1975

A grounding device designed to fit into the weld groove between two adjacent workpieces, such as lengths of pipe, is held in place by having one end anchored under a firm holder in form of a tight band surrounding one of the workpieces and annularly spaced therefrom. Contact at the joint is maintained by use of a selectively movable eccentric which can be released to break the contact and for shifting the ground to another location. The grounding contacts (a plurality are preferred) is shaped to fit the surface of the welding grove accurately, minimizing resistance at the points of contact and avoiding pitting due to arcing.

U.S. Pat. No. 4,210,373

Inventor: Norris E. McGee

Issued: Jul. 1, 1980

A ground clamp for rotatably connecting a welding cable to a workpiece which permits the workpiece to be rotated during welding while the portion of the clamp to which the cable is clamped remains substantially stationary so that the cable is not wrapped around the workpiece. The clamp may be secured to workpieces of differing configurations.

U.S. Pat. No. 4,820,901

Inventor: Thomas Peviani

Issued: Apr. 11, 1989

A quick releasable clamp for welder's ground and rod connections, characterized by a thumb operable release lever releasing an adjustable toggle link, wherein the opposed jaws have toothed engagement buried into a workpiece clamped by extended lever arms having resilience for reserved clamping energy, and alternately wherein the opposed arms have wedging action to position a rod normal to the disposition of the clamp, and wherein the cable conductor is anchored remote from its terminal electrical fitting to the frame of the clamp.

U.S. Pat. No. 5,046,958

Inventor: Ronald Brown

Issued: Sep. 10, 1991

A welding ground clamp includes a pair of frame legs that are connected together by a pivot pin assembly that also establishes electrical contact between the clamp and a ground cable. The electrical contact is such that the electrical path between the workpiece engaging elements of the clamp and the ground cable are all essentially identical, and the connection to the ground cable is spaced from the workpiece engaging elements. A handle locking assembly combines the advantages of both a spring assembly and a screw lock assembly and is located away from the workpiece engaging elements.

U.S. Pat. No. 5,616,036

Inventor: Thomas Polidori

Issued: Apr. 1, 1997

A grounding clamp for securing an electrical device to a riser pipe comprises a substantially C-shaped resilient inner segment. The inner segment has an inside surface, an outside surface, a first end and a second end. A grounding cable, which is in electrical contact with the inner segment, extends therefrom. A cam compresses the inside surface of the inner segment around the circumference of the pipe.

U.S. Pat. No. 6,279,885

Inventor: Raymond Leon

Issued: Aug. 28, 2001

A magnetic clamp (20) for welding a magnetic object (504), includes a first magnetic member (22) and a second magnetic member (24). A hinge (26) connects magnetic members (22) and (24) so that an angle formed by magnetic members (22) and (24) may be changed. A spring loaded terminal (500) having a contact end (502) is disposed between first magnetic member (22) and second magnetic member (24). Magnetic clamp (20) may be attached to magnetic object (504) so that first magnetic member (22), second magnetic member (24), and contact end (502) all abut magnetic object (504). In a preferred embodiment, a removal tab (36) is connected to magnetic clamp (20) to assist in removing magnetic clamp (20) from magnetic object (504).

U.S. Pat. No. 7,122,901

Inventor: George Franks

Issued: Oct. 17, 2006

A universal ground strap assembly including a strap having a series of uniformly sized and spaced apertures to facilitate the installation of the ground strap assembly onto a wide range of structures of various shaped and sized cross-sections is provided. A stud, through which the strap is secured, includes a terminal portion adapted to accommodate and have secured therein a ground wire. The stud includes a curved surface to engage the elongated strap with smooth transition. The stud may be captivated on the strap by at least one projection extending into the hole in the strap within which the stud is held. A curved sliding nut supported upon the strap and a curved surface of the stud are used to form a tight clamping action of the strap about the structure to be grounded, without subjecting the strap to localized stresses or tearing, but permitting the strap to tightly encircle the structure. The curved sliding nut is also captivated on the strap with stops and defines a hole to receive the stud. The strap may also include an abrading surface to penetrate the outer surface layer of the structure.

European Patent Number EP0920079

Inventor: Heinz Hortmanns

Issued: Jun. 2, 1999

The earth conductor has a metallic insert (6) of a seal (5) clamped in a flange connection of a tube conduit (1), with an insulating cladding (7). To connect the flange (2,13) several clamp screws drawn through bores (15) in the flange (13) are provided. The metallic insert (6) has an earth tongue (9) extending between the flanges (2) of the connection to convey away an electric charge. The tongue (9) extends around the periphery (20) of the respective flange (13) and extends from this to the opposite reverse side via the seat of the respective clamp screw (16). The tongue (9) has at least two holes (10,11). At least one of these is a center ring hole (10) through which the clamp screw passes to the front side of the flange. The other is an earthing hole (11) through which the clamp screw (16) passes through to the reverse side of the flange.

Japanese Patent Number JP2001340970

Inventor: Takemi Tanaka

Issued: Dec. 11, 2001

PROBLEM TO BE SOLVED: To provide a conductive plate and ground structure for spot welding which has simple and inexpensive constitution and which even if welding works are performed to many spots continuously for a long time doesn't give damages to welded members close to a ground electrode, performs spot-welding properly in excellent efficiency and workability. SOLUTION: The conductive plate 13 which is excellent in conductivity and flexibility, is attached to the metal surface exposed by peeling off paint at the appropriate place of a body 14. In this state, a clamp 7 clamps the both side of the body 14 and the ground electrode 2 to be secured. Also at the position remote from this ground electrode 2, a clamp 8 secures the body 14 and the conductive plate 13. Welding current is supplied from an electric power supply source 1 to the ground electrode 2 and a movable side electrode gun 4 through electric supply horses 3, 5, spot welding is performed at the position of the tip 4a of the electrode gun 4.

Canadian Patent Number CA2353749

Inventor: Spencer Haynis

Issued: Oct. 18, 2002

A staking nut and a grounding clamp with the staking nut are disclosed in which the clamp includes a flexible metal strap with openings through the ends of the strap. Threaded studs extend through the openings at one end of the strap to firmly attach the lug of a grounding conductor to the strap. The staking nuts are provided through the openings at the other end of the strap to prevent removal of the nuts from the strap, but permit rotation so that the nuts while held captive to the strap may be threaded upon the threaded studs to clamp the grounding clamp to a coaxial cable which is to be grounded.

While these welding clamps may be suitable for the purposes for which they were designed, they would not be as suitable for the purposes of the present invention, as hereinafter described.

DESCRIPTION OF THE REFERENCE NUMERALS

10 Ground Apparatus of the Present Invention
12 Coil
14 Horizontal length
16 Round stock 18 Down bend
20 Outward bend
22 Fitted bend
24 Outward bend
26 Clamp guide
28 Short length of tube
30 Bolt
32 Washers
34 Insulator
36 Insulator donut
38 Welding ground cable
40 Lock washer
42 Machine nut
44 Pipe
46 welding ground clamp
48 tack
50 weld rod
52 weld
54 weld joint

SUMMARY OF THE PRESENT INVENTION

In accordance with the present invention, there is provided a means for securing a grounding point in a stable position with a stable means. Conventional pipeline grounds are really not very stable. A length of rod like material with around a half turn in center length, two offset bends on opposing sides after 1½ turn bend one up one down. Allows 1½ turn bent to level. Opposing sides, short horizontal length between offsets to vertical down bend. Short length after vertical down bend to start the point for a pipe radius bend, pipe radius bend travels, below center axis of desired pipe size radius, for a gripping action. At the end of the radius bend a short outward bend, To aid in the applying and removing of a ground from a pipe, and for protection of the pipes coating, Coated for insulation except for the 1½ turn bend, where movement of spring action is desired, for holding power. Left side near vertical down bend, tube attached for holding ground cable in secure manor. Loop in 1½ bend is placement for insulators and a bold for cable connection and placement for a grounding point. (Grounding point is small piece of parent or base metal tacked on the bolt head)

Another object of the present invention is to provide a means for providing a reliable welding ground clamp having an adjustable securing base to accommodate any size pipe.

Yet another object of the present invention is to provide a means for providing a solid welding ground that cannot be easily lost, knocked off or disengaged Additional objects of the present invention will appear as the description proceeds.

The present invention overcomes the shortcomings of the prior art by providing a welding ground clamp comprising a spring clamp having a pair of spaced apart curvilinearly extending arms for circumferentially engaging a workpiece, a guide retainer for ground cable attached to one of the spring clamp arms, fasteners and insulators for securing the ground cable to the welding ground clamp.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Figure 1:
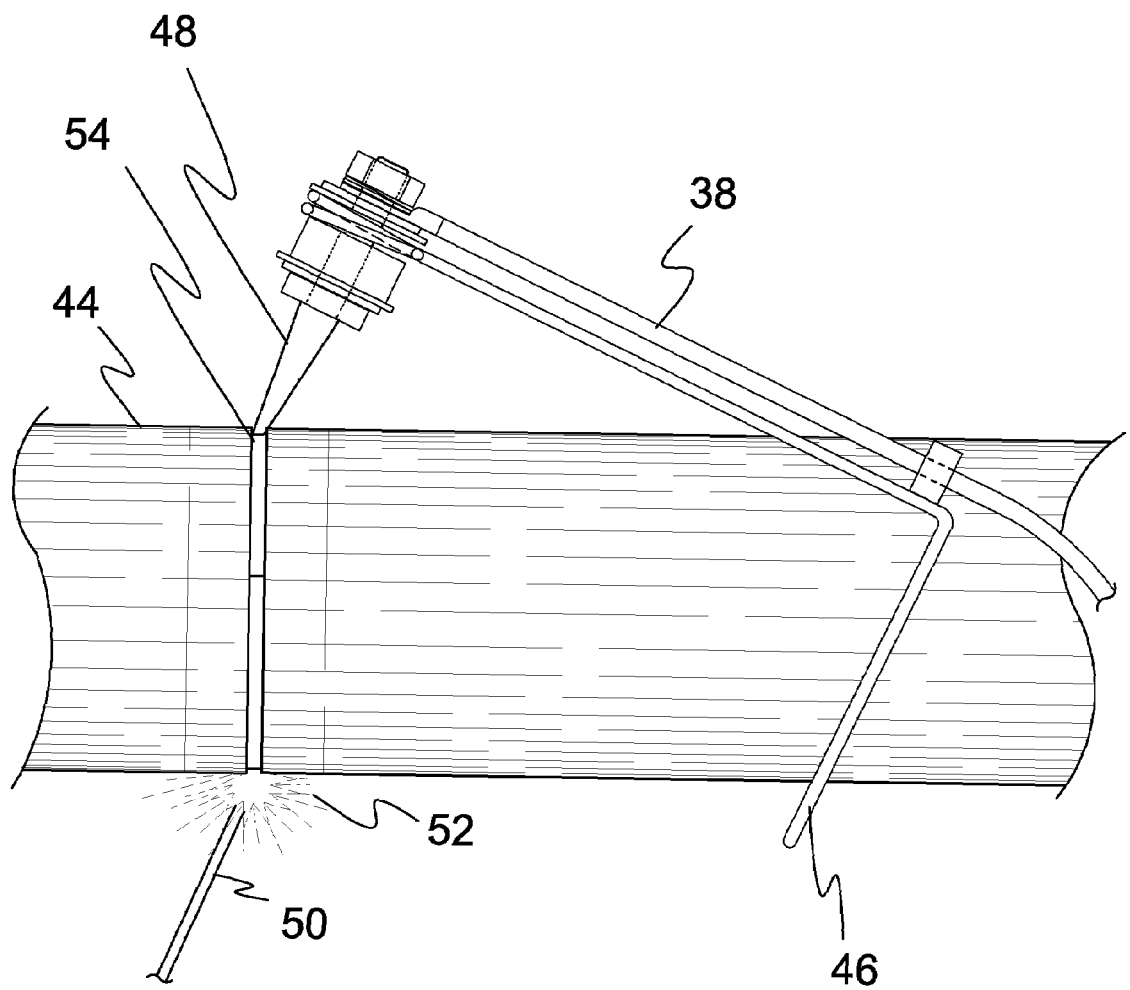
FIG. 1 is an illustrative view of the present invention in use.

Referring to FIG. 1, shown is an illustrative view of the present invention in use. Conventional pipeline grounds are fabricated by welders on the job, with material available in shortest time possible. The present invention provides a welding ground clamp 46 comprising a spring clamp having a pair of spaced apart curvilinearly extending arms for circumferentially engaging a workpiece 44, a guide retainer for ground cable 38 attached to one of the spring clamp arms, fasteners and insulators for securing the ground cable to the welding ground clamp. A tack 44 of similar material as that being welded having a substantially linear edge 54 for engaging the edge of the workpieces.

Figure 2:
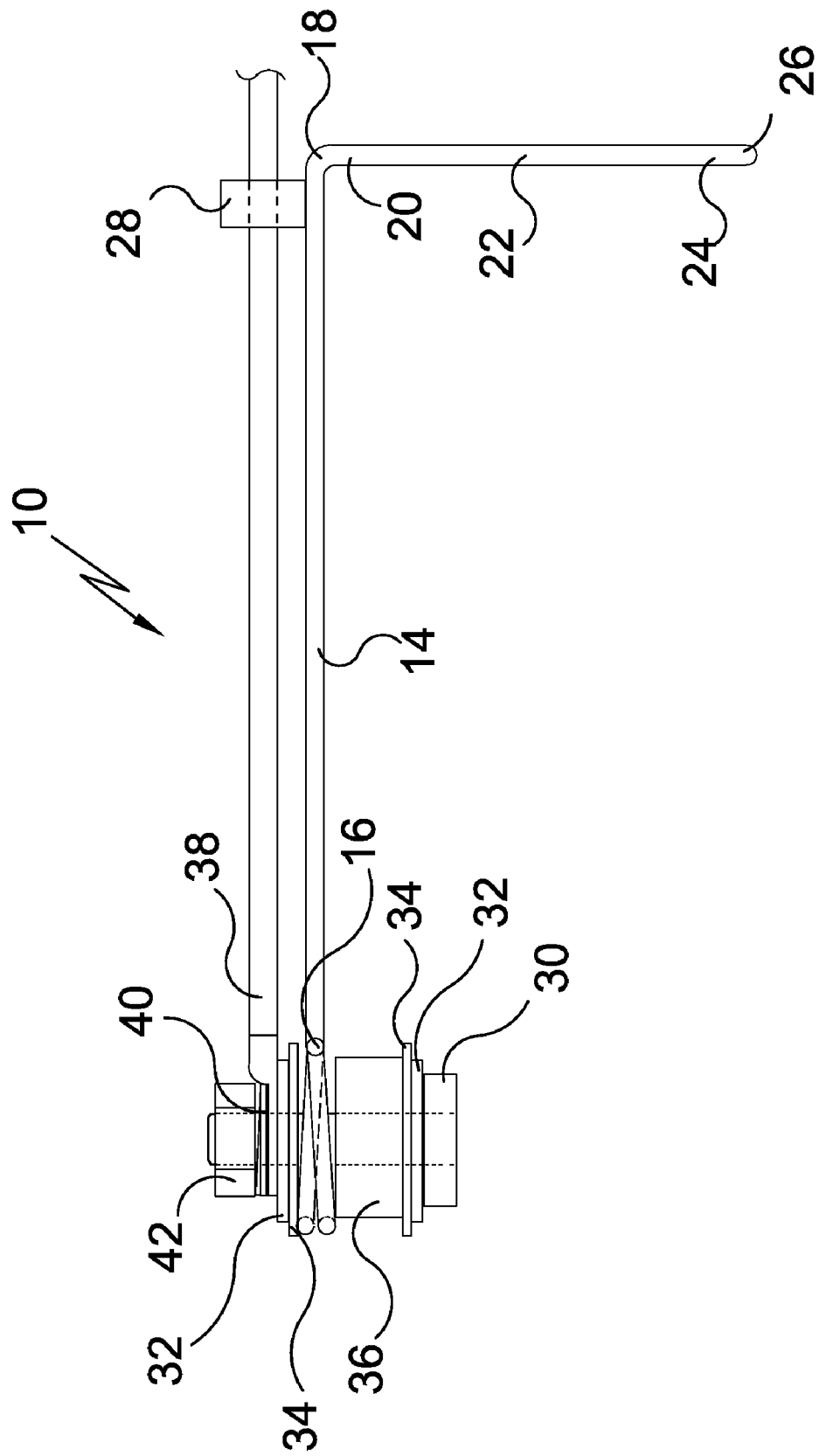
FIG. 2 is a side assembled view of the present invention.

Referring to FIG. 2, shown is a side assembled view of the present invention. The present invention is a welding ground clamp 10 comprising a spring clamp having a pair of spaced apart curvilinearly extending arms 22 for circumferentially engaging a workpiece, a guide retainer 28 for ground cable attached to one of the spring clamp arms 14, fasteners and insulators for securing the ground cable to the welding ground clamp.

Figure 3:
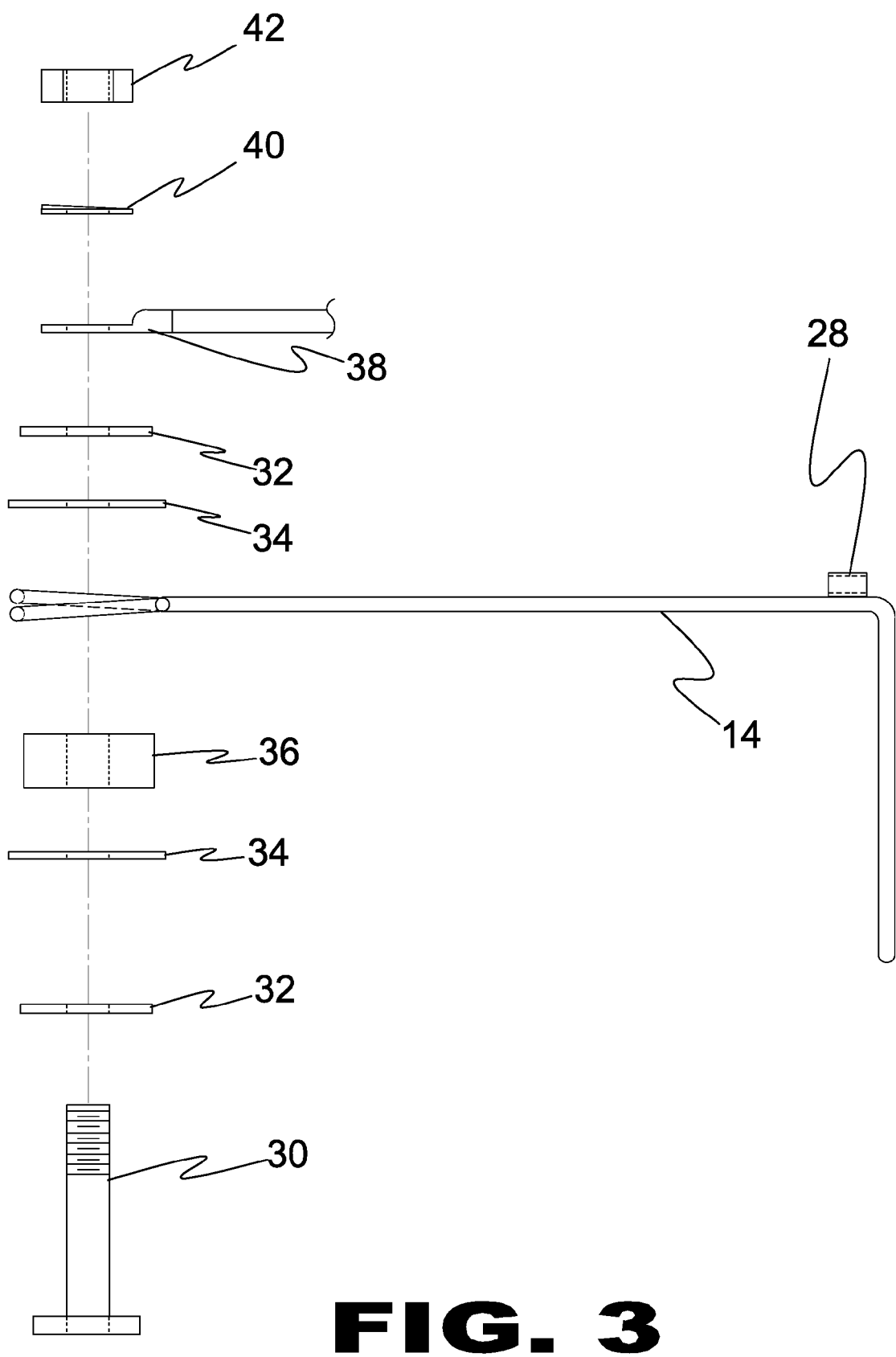
FIG. 3 is a side exploded view of the present invention.

Referring to FIG. 3, shown is a side exploded view of the present invention. Shown is a side exploded view of the pipeline hugger ground of the present invention 10. The illustration shows the workpiece attaching frame having horizontal member 14 with ground cable guide 28. Bolt 30 having insulators 34, 36, washers 32, lock washer 40 and nut 42 fastens ground cable 38 to the workpiece attaching frame.

Figure 4:
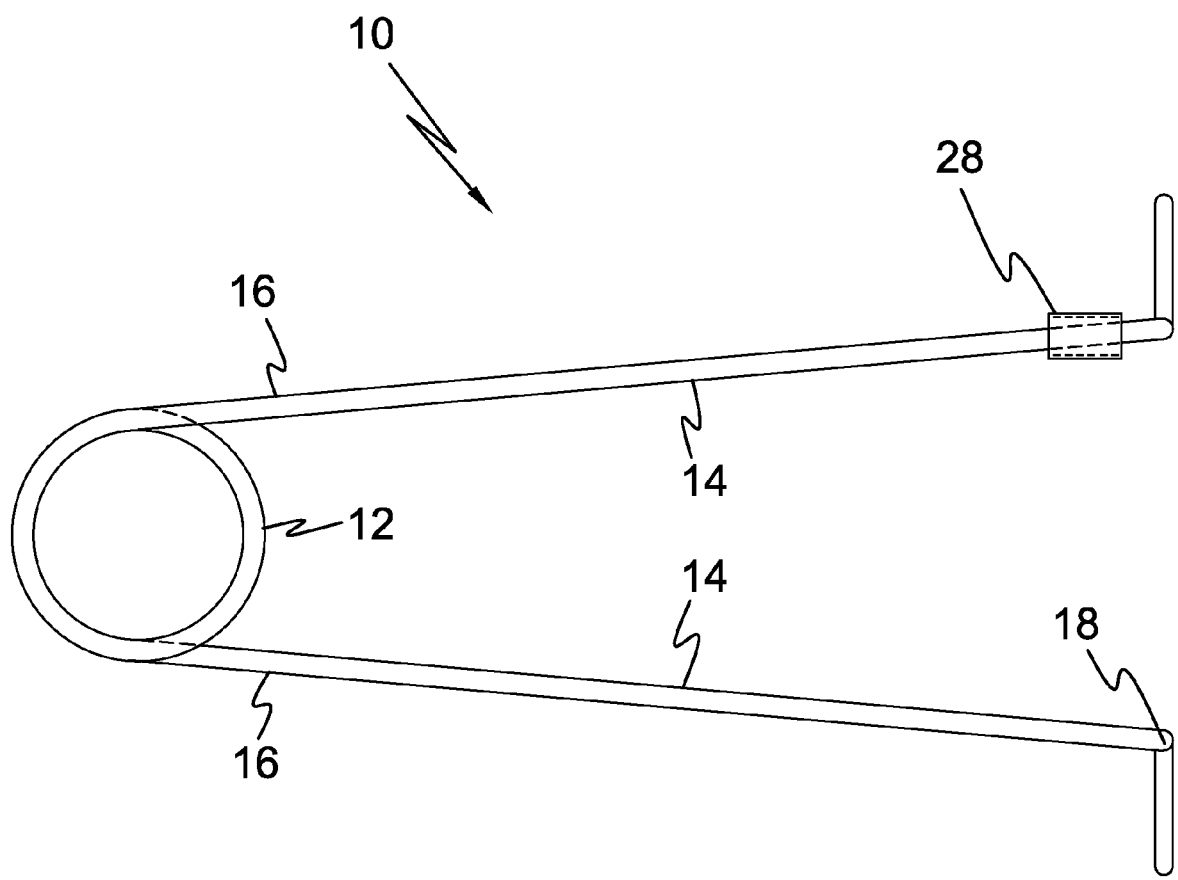
FIG. 4 is a top view of the present invention.

Referring to FIG. 4, shown is a top view of the present invention. Shown is a top view of the pipeline hugger ground 10 of the present invention. The illustration shows the workpiece attaching frame having coil 12 depending bend 18 with horizontal section 14 extending therebetween preferable comprising round stock 16.

Figure 5:
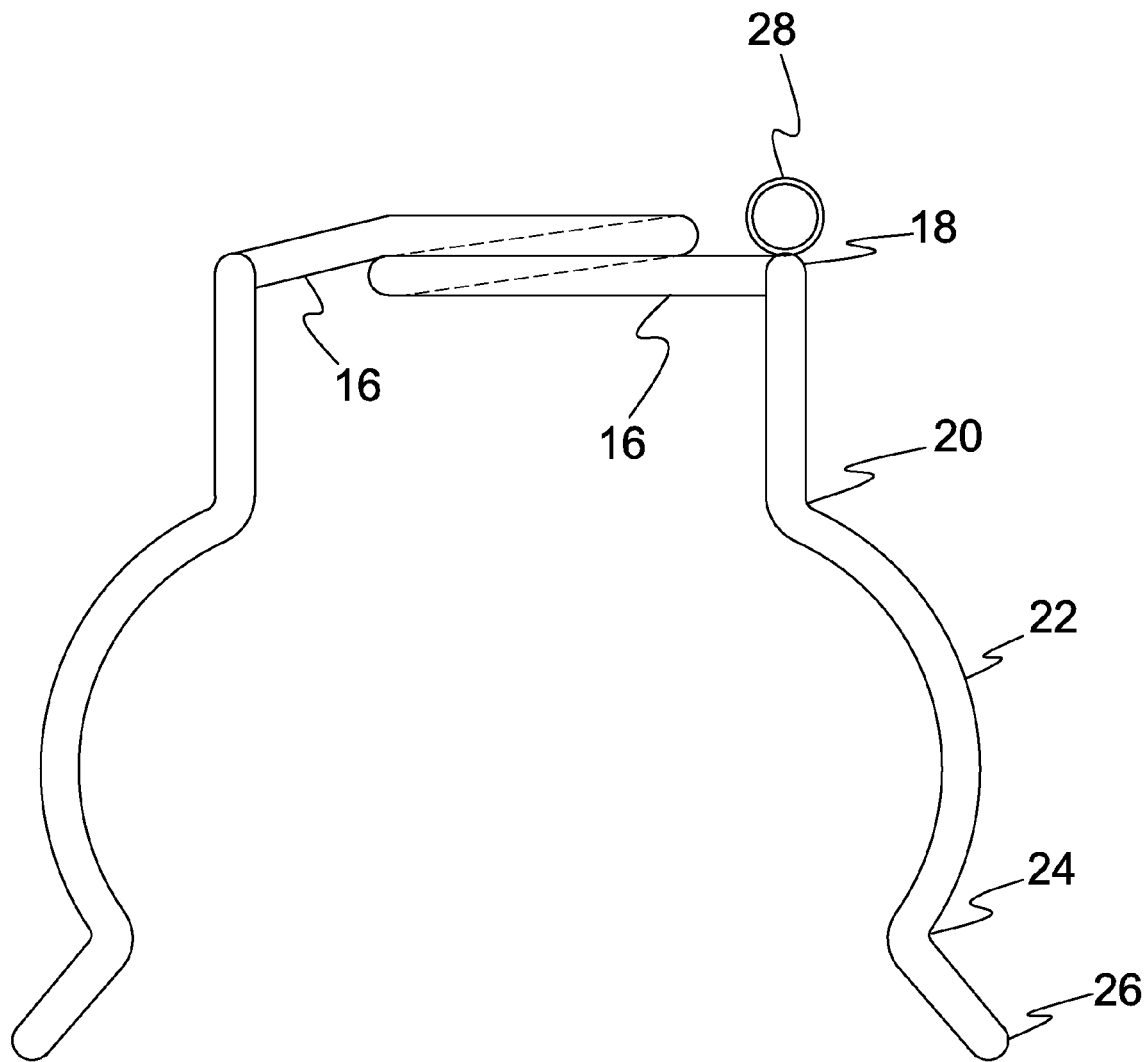
FIG. 5 is back view of the present invention.

Referring to FIG. 5, shown is back view of the present invention. Shown is a back view of the present invention having offset bends on either sides. The present invention provides a welding ground clamp comprising a spring clamp for attaching to a workpiece that is preferably constructed of round stock 16. A pair of spaced apart curvilinearly extending arms for circumferentially engaging a workpiece are comprised of downwardly depending bend 18 with outward bend 20 bowed bend 22 terminating in with guide 26 from outward bend 24. Also shown is ground cable guide 28.

Figure 6:
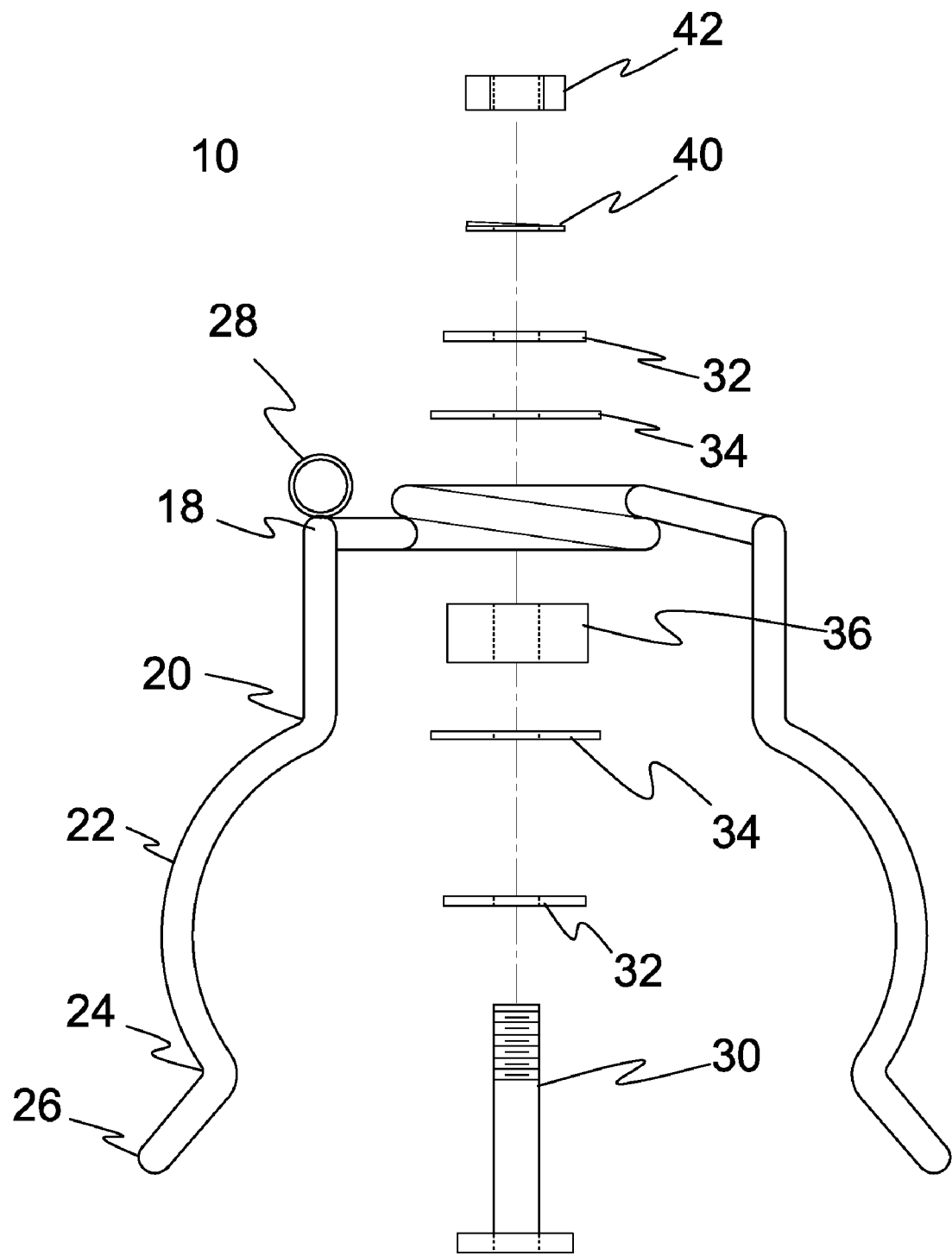
FIG. 6 is an exploded insulator end view of the present invention

Referring to FIG. 6, shown is an exploded insulator end view of the present invention. Shown is welding ground clamp comprising a spring clamp for attaching to a workpiece having a pair of spaced apart curvilinearly extending arms for circumferentially engaging a workpiece. Each arm is formed of downwardly depending bend 18 with outward bend 20 bowed bend 22 with outward bend 24 terminating in clamp guide 26. The ground cable passing through cable guide 28 is held to the workpiece housing clamp by bolt 30 having insulators 34, 36, washers 32, lock washer 40 and nut 42.

Figure 7:
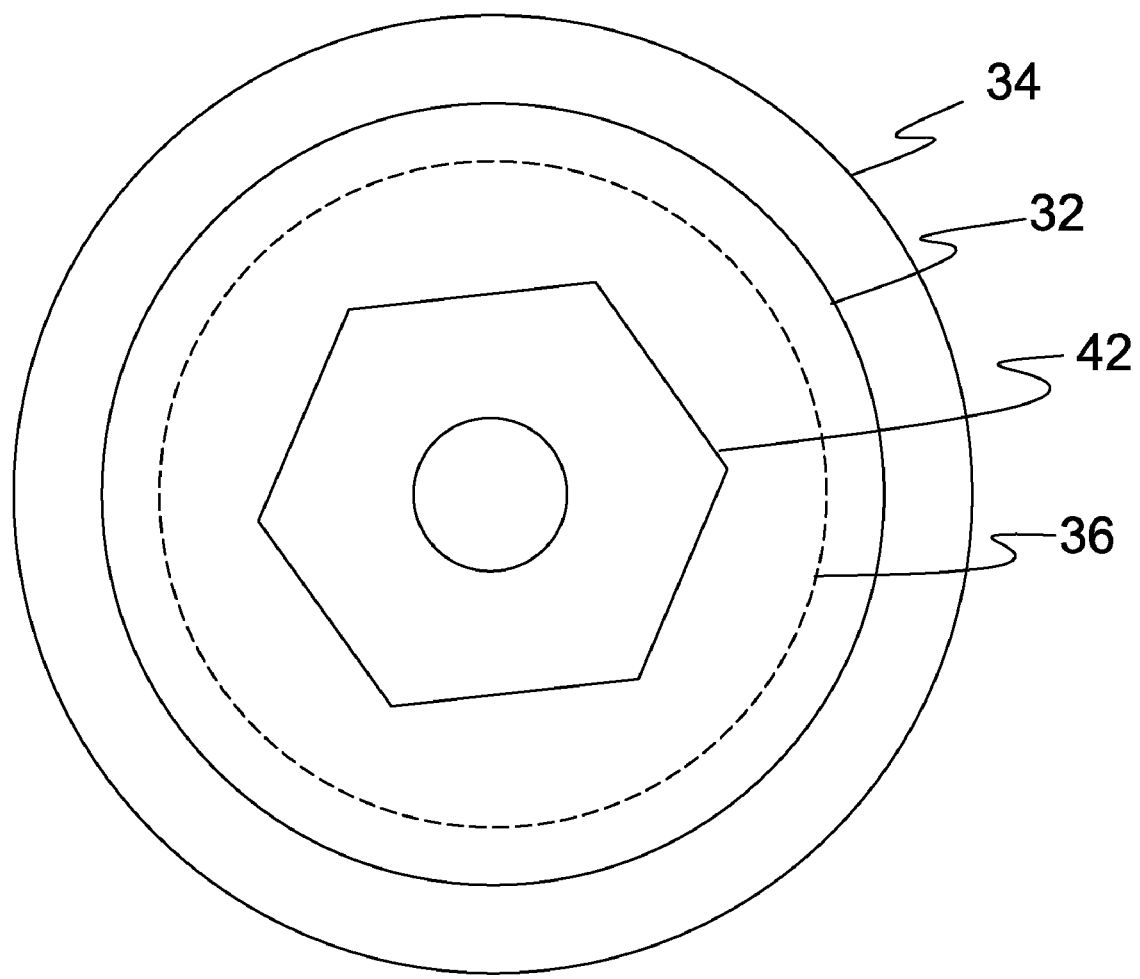
FIG. 7 is a top view of insulators of the present invention.

Referring to FIG. 7, shown is a top view of the present invention. Shown is a top view of the insulators 34, 36 of the present invention having bolt and nut assembly 30, 42 with flat washers 32 for protection of the insulators. The present invention is a welding ground clamp comprised of a spring clamp with a pair of depending spaced apart curvilinearly extending arms for circumferentially engaging a workpiece, a guide retainer for ground cable attached to one of the spring clamp arms, fasteners and insulators for securing the ground cable to the welding ground clamp.

Figure 8:
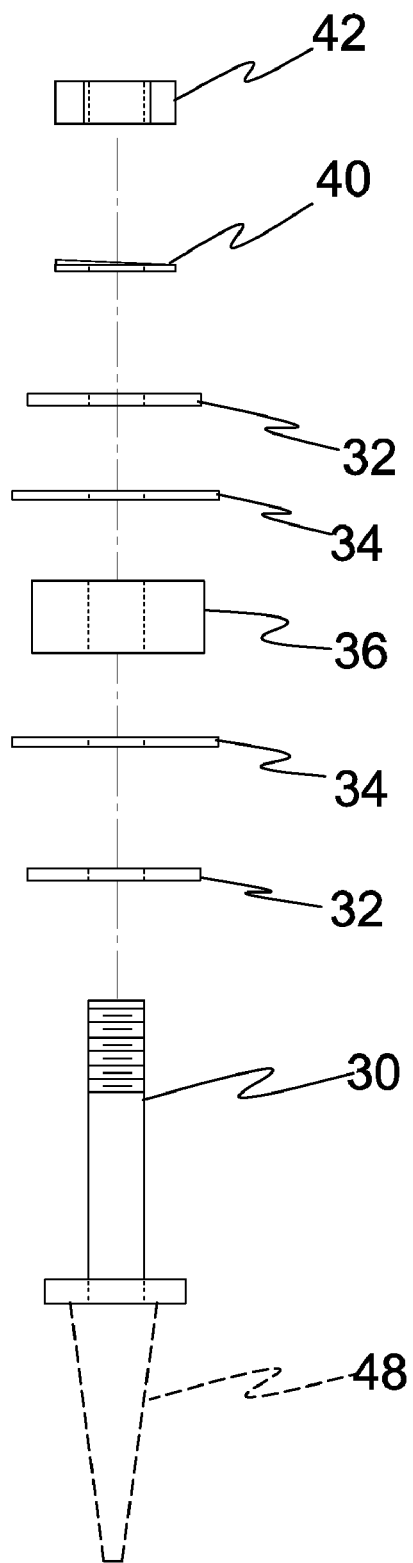
FIG. 8 is a side exploded view of insulators the present invention

Referring to FIG. 8, shown is a side exploded view of insulators the present invention. Shown is the ground cable fastener comprising bolt 30 having insulators 34, 36, washers 32, lock washer 40 and nut 42 having tack 48 fastened to bolt 30 preferably taken from the parent metal.

Figure 9:
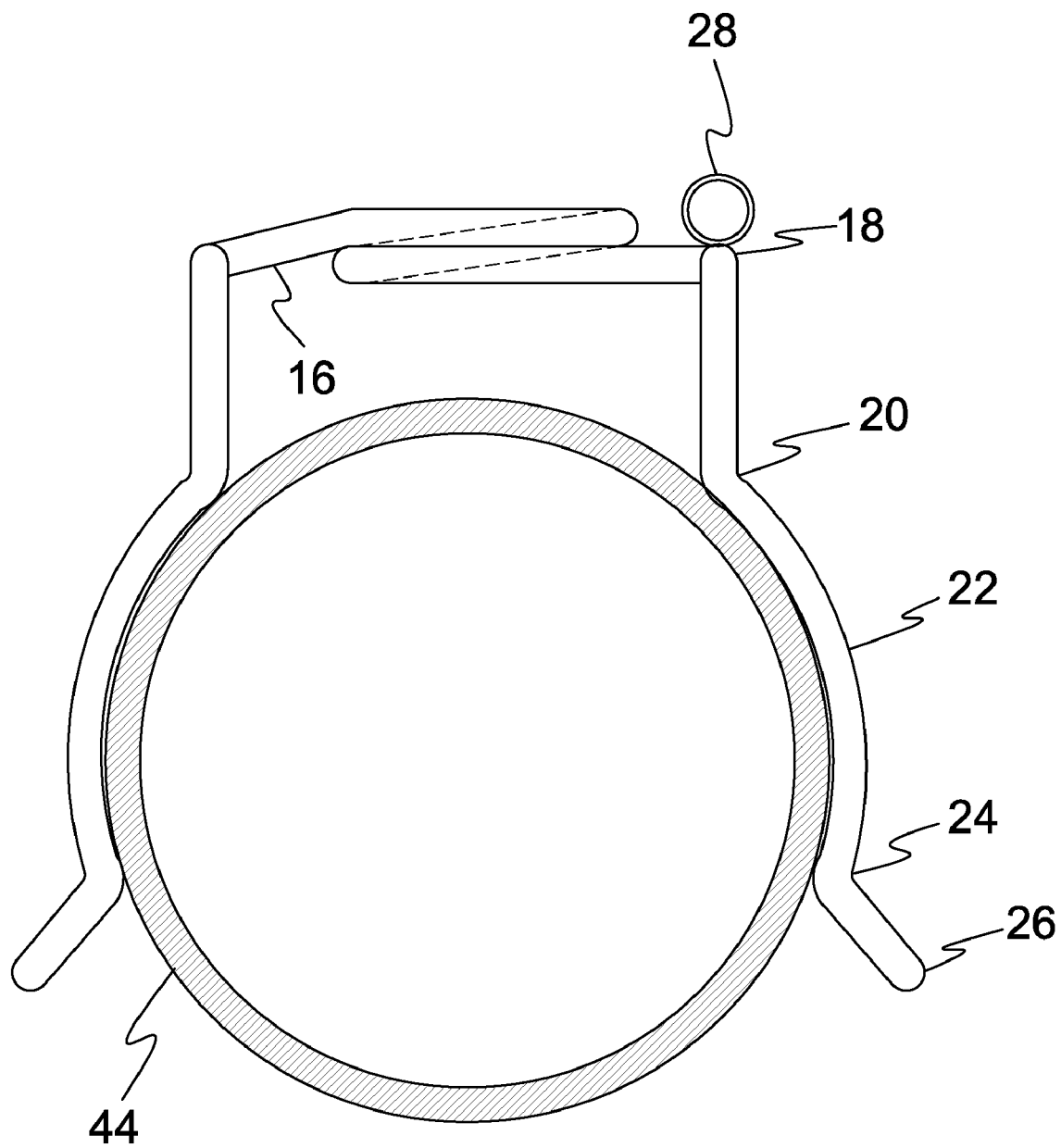
FIG. 9 is a back view of the present invention.

Referring to FIG. 9, shown is a back view of the present invention. Shown is a back view of the present invention 10 having offset bends 20, 22, 24 on either sides with clamp guide 26 mounted to a pipe 44. The present invention provides a welding ground clamp comprising a spring clamp having a pair of spaced apart curvilinearly extending arms for circumferentially engaging a workpiece, a guide retainer for ground cable attached to one of the spring clamp arms, fasteners and insulators for securing the ground cable to the welding ground clamp.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A welding ground clamp comprising:
   a) a pair of spaced apart jaws each having a bowed portion for engaging a workpiece;
   b) an arm extending from each jaw converging into a coil;
   c) a conductive fastener securable within said coil;
   d) the conductive fastener having a planar bottom surface for attaching a conductive material; and
   e) a ground cable having a fastener for receiving the conductive fastener with the cable extending to ground.

2. The clamp of claim 1, wherein one of said arms has a ground cable guide retainer fastened approximate a jaw for passing the ground cable therethrough thereby keeping the ground cable away from the workarea.

3. The clamp of claim 2, wherein the pair of spaced apart jaws are sheathed in an insulative material to maintain continuity of the ground.

4. The clamp of claim 3, wherein the clamp is formed from a continuous length of rod-like material.

5. The clamp of claim 4, wherein the conductive fastener is comprised of a conductive bolt mounted within the clamp coil.

6. The clamp of claim 5, further comprising a plurality of insulators mounted on the top side and bottom side of the clamp coil.

7. The clamp of claim 6, wherein one of the insulators centers the conductive fastener approximate the center of the coil.

8. The clamp of claim 7, further comprising a tack fastened to the planar surface of conductive bolt.

9. The clamp of claim 8, wherein said tack has a linear end for placement between the workpieces.

10. The clamp of claim 9, wherein said tack is of similar material as that being welded.

* * * * *